(12) United States Patent
Meliksetian et al.

(10) Patent No.: US 7,788,082 B2
(45) Date of Patent: *Aug. 31, 2010

(54) COMPUTATIONAL LINGUISTIC STATEMENTS FOR PROVIDING AN AUTONOMIC COMPUTING ENVIRONMENT

(75) Inventors: Dikran Meliksetian, Danbury, CT (US); Louis M. Weitzman, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 307 days.

This patent is subject to a terminal disclaimer.

(21) Appl. No.: 11/950,748

(22) Filed: Dec. 5, 2007

(65) Prior Publication Data
US 2008/0140386 A1 Jun. 12, 2008

Related U.S. Application Data

(63) Continuation of application No. 10/621,932, filed on Jul. 17, 2003, now Pat. No. 7,328,156.

(51) Int. Cl.
*G06F 17/20* (2006.01)
(52) U.S. Cl. .............................. 704/1; 704/9; 704/257; 704/231
(58) Field of Classification Search ..................... 704/1, 704/9, 231, 257
See application file for complete search history.

(56) References Cited

U.S. PATENT DOCUMENTS

| 4,972,453 | A | | 11/1990 | Daniel, III et al. | |
|---|---|---|---|---|---|
| 5,111,398 | A | * | 5/1992 | Nunberg et al. | ................ 704/9 |
| 5,408,603 | A | * | 4/1995 | Van de Lavoir et al. | ..... 715/763 |
| 5,995,955 | A | | 11/1999 | Oatman et al. | |
| 6,052,693 | A | | 4/2000 | Smith et al. | |
| 6,233,545 | B1 | * | 5/2001 | Datig | ............................ 704/2 |
| 6,324,656 | B1 | | 11/2001 | Gleichauf et al. | |
| 6,353,824 | B1 | | 3/2002 | Boguraev et al. | |
| 6,377,543 | B1 | | 4/2002 | Grover et al. | |
| 6,427,146 | B1 | | 7/2002 | Chu | |
| 6,604,075 | B1 | | 8/2003 | Brown et al. | |
| 6,721,697 | B1 | | 4/2004 | Duan et al. | |
| 7,120,868 | B2 | | 10/2006 | Salesin et al. | |
| 2002/0042707 | A1 | | 4/2002 | Zhao et al. | |
| 2002/0178380 | A1 | | 11/2002 | Wolf et al. | |
| 2005/0071150 | A1 | | 3/2005 | Nasypny | |

OTHER PUBLICATIONS

Christopher M. Langan "The Cognitive-Theoretic Model of the Universe: A New Kind of Reality Theory", pp. 1-56 (2002).
A.V. Konstantinou et al. "Towards Self-Configuring Networks", DARPA, pp. 1-14 (2002).

(Continued)

*Primary Examiner*—Qi Han
(74) *Attorney, Agent, or Firm*—John E. Campbell

(57) ABSTRACT

A method for autonomic computing using a relational grammar represented in a mark-up language. In response to a system input change, the autonomic relational grammar and the autonomic system input is parsed to form an autonomic derivation tree representing autonomic system tokens, categories, attributes and relationships. An action is taken as defined by the relational grammar according to the input changes sensed.

14 Claims, 7 Drawing Sheets

OTHER PUBLICATIONS

A. Feldmann et al. "IP Network Configuration for Introdomain Traffic Engineering", pp. 1-27 (2002).

K. Wittenburg et al. "Unification-Based Grammars and Tabular Parsing for Graphical Languages", Journal of Visual Languages and Computing, 1991, pp. 347-370.

L. Weitzman "The Architecture of Information: Interpretation and Presentation of Information in Dynamic Environments", pp. 1-151, (1995).

K. Wittenburg "The Relational Language System", Computer Graphics and Interactive Media Group, Bellcore, Technical Memorandum TM-AR11-022353. Dec. 1992, pp. 1-24.

* cited by examiner

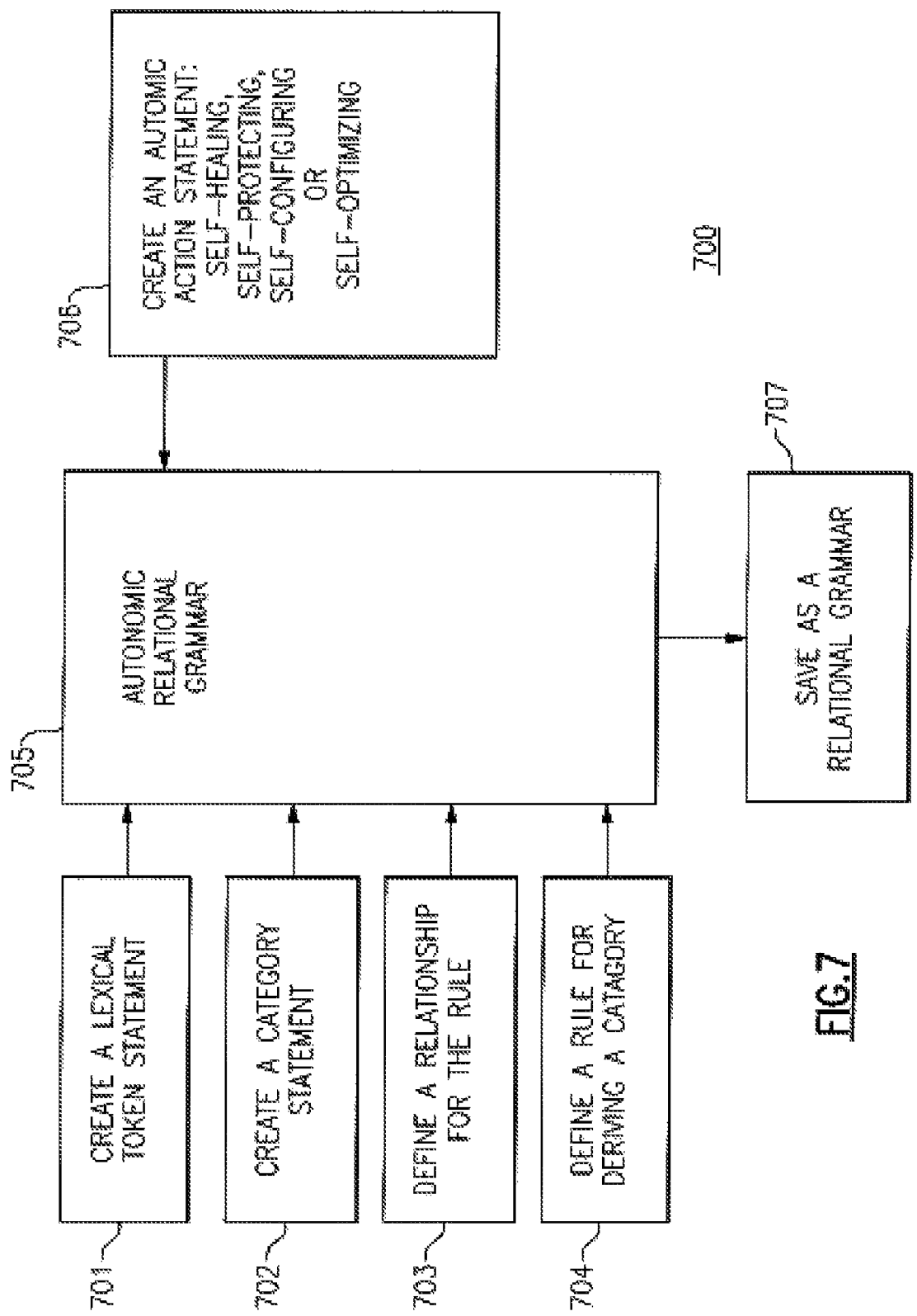

COMPUTATIONAL LINGUISTIC STATEMENTS FOR PROVIDING AN AUTONOMIC COMPUTING ENVIRONMENT

CROSS-REFERENCE TO RELATED APPLICATIONS

This application is a continuation of U.S. patent application Ser. No. 10/621,932 "COMPUTATIONAL LINGUISTIC STATEMENTS FOR PROVIDING AN AUTONOMIC COMPUTING ENVIRONMENT" filed Jul. 17, 2003 now U.S. Pat. No. 7,328,156.

FIELD OF THE INVENTION

The present invention is related to autonomic computing. It is more particularly related to creating autonomic computer programs using computational linguistic statements, in particular Relational Grammar statements.

BACKGROUND OF THE INVENTION

It is widely felt that computing is too complicated, not only on a personal level but also at every level. Getting information technology infrastructure in (the hardware, the software, the services and support) is becoming too complex. It's felt that it's time to radically change the way we compute. Computing should work more like out autonomic nervous system. The autonomic nervous system regulates your body's basic functions without your conscious awareness. For instance, when you run to catch the train you don't need to consciously decide to excrete adrenaline, reallocate oxygen to the muscles in your legs and increase your heart rate. Walk from your cozy home into the cold of winter, and your body redirects blood flow away from any exposed areas (like your face) to maintain a constant internal temperature. Your autonomic nervous system does all of this for you.

Computers should demonstrate the same ability to regulate themselves. In fact, if we plan to continue to expand the network of reliable interconnected systems, they must regulate themselves. There are simply too many operations taking place for human administrators to oversee.

At current rates of expansion, it has been estimated that there will not be enough skilled Information Technology (I/T) people to keep the world's computing systems running. Unfilled I/T jobs in the United States alone number in the hundreds of thousands. Even in uncertain economic times, demand for skilled I/T workers are expected to increase by over 100 percent in the next six years. By some estimates, global support for a billion people and millions of businesses connected via the Internet (a situation we could reach in the next decade) could require more than 200 million I/T workers; that's close to the population of the entire United States.

Autonomic computing has been proposed to solve the problem. Some characteristics of Autonomic computing are that an Autonomic computer system should:

\*Know itself\* and comprise components that also possess a system identity;

Configure and reconfigure itself under varying and unpredictable conditions;

Never settle for the status quo—it always looks for ways to optimize its workings;

Perform something akin to healing—it must be able to recover from routine and extraordinary events that might cause some of its parts to malfunction;

Be an expert in self-protection—a virtual world is no less dangerous than the physical one;

Know its environment and the context surrounding its activity, and acts accordingly;

Function in a heterogeneous world and implement open standards—it cannot exist in a hermetic environment; and Anticipate the optimized resources needed while keeping its complexity hidden.

An Autonomic computer system therefore, should be Self-configuring; Self-protecting; Self-healing; and Self-optimizing.

In autonomic computing environments, identification of situations for enabling the configuring and optimizing, healing and management of networked environments is a problem. Traditional methods use a rule-based approach, where a set of rules are defined to identify the conditions and resulting actions to take.

In example cases of a self-configuring, self-optimizing, self-healing, and self-protecting environment, the system must find patterns in the context of the system resources. A standard way to do this is through the use of rule-based systems.

Typically, rule-based systems are used to perform complex task in an "intelligent" fashion. But there are many drawbacks to the rule-based approach. Most notably, there are complications as the number of rules increase and the interaction between the rule-sets becomes more uncertain.

Language-based approaches provide more structure when constructing these potential solutions.

SUMMARY OF THE INVENTION

The present invention describes the use of a language-based system for autonomic computing instead of the traditional rule-based system. Language-based systems have been shown to facilitate document creation, maintenance and distribution. This invention uses the technique of articulating autonomic computing solutions based on parsing and syntax-directed translation using Relational Grammars, or their equivalent. A "Relational Grammar System" by Wittenburg from Bellcore (Technical Memorandum TM-ARH-022353) can be found on the world wide web at www.geocities.com/ResearchTriangle/Facitity/8000/papers/rl-manual.pdf discusses Relational Grammars and parsing with such grammars. This translation phase is followed by a constraint solving mechanism to create the final solution needed to be applied. Grammatical rules provide the mechanism for mapping from a representation of the content and context of potential infrastructure problems to the procedural solutions that need to be applied. These solutions include sets of procedural and temporal constraints between elements of the computing environment. Individual grammars encapsulate the specifics of a given problem space and are used as generators of solutions in that space. By making the grammars sensitive to the requirements of the output context, parsing introduces flexibility into the solution specification process.

Additional features and advantages are realized through the techniques of the present invention. With this invention, the complexity of the rule creation is reduced, thereby reducing the potential for conflicting and confusing rule interaction.

Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 7 depicts a flow diagram example of creating a grammar according to the invention.

DETAILED DESCRIPTION OF THE PREFERRED EMBODIMENTS

Figure 1:
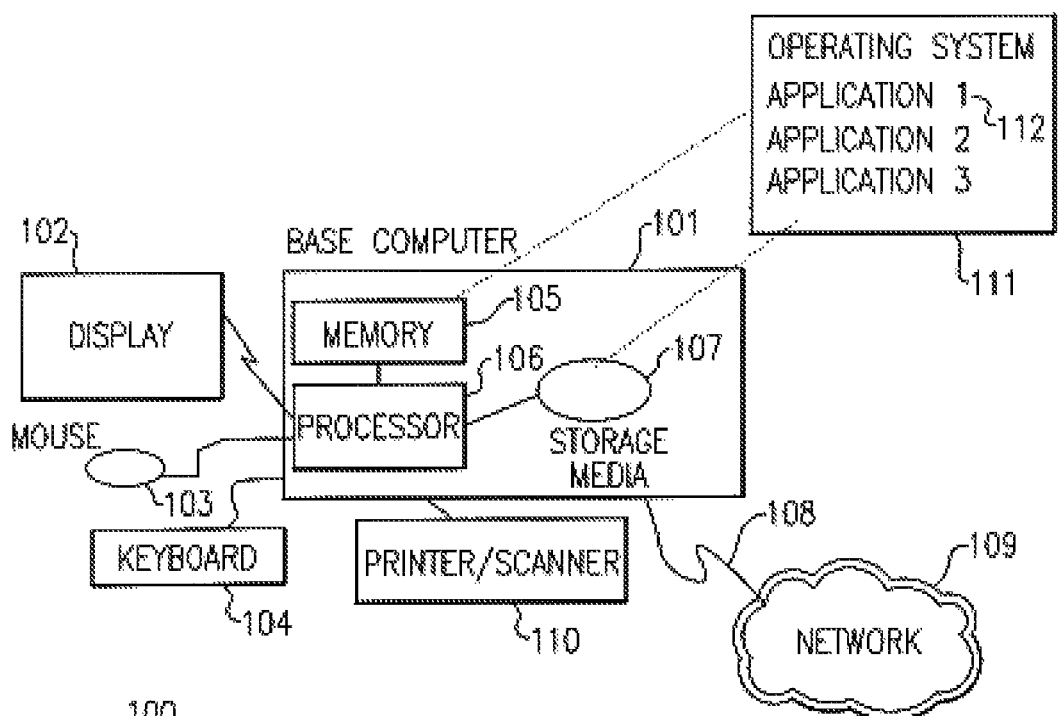
FIG. 1 is a diagram depicting components of a computer system.

The present invention uses Relational Grammars and their derivatives to construct a "language" of autonomic computing and build solution "sentences" to adapt the environment in real time. With a language-based approach, there is more structure in the pattern recognition and a more understandable set of rules emerges than in the traditional rules based solution. It is well suited to assist in the construction and evaluation of models, e.g., to understand the relationships among components of a system.

A Doctoral Thesis "The Architecture of Information" by L. Weitzman, available from Massachusetts Institute of Technology discusses a computational linguistics approach to automate and support the design of the layout of a 2-dimensional page and time-base layout of 2-dimensional content. This invention extends that notion to structuring programs and data as exemplified in an autonomic computing environment.

Work on syntactic models of natural language processing have drawn upon research in both computer science, which is interested in efficiency and search, and linguistic theory, which is interested in the formalisms that can be used to characterize the grammatical strings of natural language. The syntax of natural language is concerned with two interrelated concepts, grammars and parsing algorithms. A grammar is a finite specification of a possibly infinite set of languages that systematically captures the regularities of the language. A grammar can be used to generate sentences in the language. It can also be used to determine whether a given input string belongs to the language and identify the structure according to the grammar. Parsing algorithms, on the other hand, specify how to apply a grammar to a sequential input string to produce a structured representation, or derivation tree. In a preferred embodiment, a parser includes both the grammar and the parsing algorithm. A grammar is composed of one or more rules that preferably map multiple symbols to a new symbol. In natural language, for instance, a sentence "S" is formed from a noun phrase "NP" and a verb phrase "VP". This is captured in the rule:

S->NP+VP

The left-hand side of the rule is the category, (also referred to as a composed element) formed by the rule application on the input. In this case, a sentence "S" is formed. This is sometimes referred to as the mother or parent of the rule. The right-hand side of the rule is a list of the input necessary for the rule to apply. In this case, the grammar indicates that a noun phrase "NP", preceding a verb phrase "VP", is necessary. These are sometimes referred to as the daughters or children of the rule.

Parsing

Parsing is the process of determining the structure of the sentence being parsed. Parsing is discussed in "Unification-Based Grammars and Tabular Parsing for Graphical Languages" Journal of Visual Languages and Computing, Volume 2; Wittenburg, K., L. Weitzman, and J. Talley (1991), pp. 347-370, Academic Press Limited. Using a grammar that describes the structure of strings in a particular language, a parser assigns a structure to a grammatical sentence. This structure is called a parse tree, (also known as a derivation tree) (See Derivation Tree structure in FIG. 3). The parse tree corresponds to the order in which the rules within the grammar can be applied to transform a start symbol, or goal state, into the final structure. The start symbol 310 of the simple language above is "S", indicating that a sentence is the goal of the parsing process. Top-down processing begins with the start symbol 310 and applies the grammar rules forward until the symbols at the terminals 301-307 of the tree correspond to the components of the sentence being parsed. This is a goal-directed search. On the other hand, bottom-up parsers start with the sentence being parsed 301-307 and apply the rules backward to build a derivation tree 300 whose terminals are the words of the sentence and whose top node 310 is the start symbol, or a goal state, of the grammar. This search through the space of alternatives is data-driven and builds successive layers of syntactic abstractions.

Semantics:

Semantic interpretation is the process of mapping natural language utterances onto some representation of the world, or onto a model of the real or an imaginary world. Conventionally, semantics is about the truth or satisfaction conditions of a particular utterance, while pragmatics deals with the context and the intentions of the speakers. According to the principle of compositionality, put forth by the philosopher Frege, the meaning of a sentence can be expressed in terms of the meanings of its parts. The rule-to-rule hypothesis provides a framework in which syntactic and semantic rules are matched, (i.e., each syntactic rule has a semantics component). Taken together this means that semantics can be formed by taking the semantics of the rule that generated the tree and applying it (as a function) to the semantics of the constituents of the tree.

Generation:

The basic task of language generation is to produce a valid string in the target language given a parse tree. Determining what words and phrases to use in describing the structured representations is one of the basic decisions. Language generation is similar to language understanding in that the initial work concentrated on conversion of isolated sentences. However, growing interest in discourse and pragmatics has led increasingly to the development of systems that deal with multi-sentence text production. In fact, the characterization of multimedia generation is similar to this expanded notion of language generation. Both of these processes include:

1) content selection, constructing a structure that represents the information to be communicated;
2) media planning, organizing the content to be communicated so the resulting discourse is appropriate to the function of the media and for the intended audience; and 3) content realization, how to say the sequence of "utterances" by applying lexical information Syntactic Rules Computational linguistics has developed theories and techniques which have proven useful for string languages as mentioned previously. By extending them into the autonomic computing environment, we can gain significant leverage. Using an independently motivated parser has a number of advantages. Most importantly, if we think of autonomic computing as a structured language, we can use the grammar and parsing technologies to extract that structure and provide a better understanding of that information. In addition, we can take advantage of all the previous work in natural language processing. As progress is made in natural language processing, those advances can be incorporated into the methods used herein.

The basic process of the parser is to build structure, preferably in the form of a derivation tree 300, from the elements of input in the autonomic environment. Each leaf of the tree represents lexical items in the grammar. When rules fire, composite elements are created, moving up to the next branch of the tree. When the top of the tree is reached 310, the final composite is formed, completing the "autonomic sentence." This is graphically represented in FIG. 3. There is a wide-ranging family of higher-dimensional grammar frameworks which include array, tree, or graph grammars and unification-based constraint grammars. Where string grammars generate or compose expressions consisting of one-dimensional arrays of symbols, these higher-dimensional grammars deal in structures characterized by the domain. For example, these characterizations might be based on geometric positions in two or three dimensional space, or topological connectivity, or arbitrary semantic relations holding among information objects. The motivation for using higher-dimensional grammars rather than string-based grammars is that strings alone will not be a rich enough structure to capture relationships in the autonomic computing domain. The information content and context serving as the input to an autonomic response cannot be naturally or easily coerced into a string.

The higher-dimensional grammars used in this invention are called Relational Grammars. The Relational Grammar approach used here can be viewed as a graph-rewriting problem. The relations are represented by arcs, and terminals and non-terminals of the grammar by labeled nodes. One could then define graph replacement rules that would rewrite graphs to other graphs. It is useful to provide indirection between graphical relations named by the grammar and the operations that might have to verify them as constraints relative to particular database queries on computational objects. This indirection helps to maintain a generality to the approach by preserving independence between the grammar and the database. However, it does complicate the determination of the computational complexity of the algorithm.

FIG. 1 illustrates a representative workstation or server hardware system in which the present invention may be practiced. The system 100 of FIG. 1 comprises a representative computer system 101, such as a personal computer, a workstation or a server, including optional peripheral devices. The workstation 101 includes one or more processors 106 and a bus employed to connect and enable communication between the processor(s) 106 and the other components of the system 101 in accordance with known techniques. The bus connects the processor 106 to memory 105 and long-term storage 107 which can include a hard drive, diskette drive or tape drive for example. The system 101 might also include a user interface adapter, which connects the microprocessor 106 via the bus to one or more interface devices, such as a keyboard 104, mouse 103, a Printer/scanner 110 and/or other interface devices, which can be any user interface device, such as a touch sensitive screen, digitized entry pad, etc. The bus also connects a display device 102, such as an LCD screen or monitor, to the microprocessor 106 via a display adapter.

The system 101 may communicate with other computers or networks of computers by way of a network adapter capable of communicating with a network 109. Example network adapters are communications channels, token ring, Ethernet or modems. Alternatively, the workstation 101 may communicate using a wireless interface, such as a CDPD (cellular digital packet data) card. The workstation 101 may be associated with such other computers in a Local Area Network (LAN) or a Wide Area Network (WAN), or the workstation 101 can be a client in a client/server arrangement with another computer, etc. All of these configurations, as well as the appropriate communications hardware and software, are known in the art.

Figure 2:
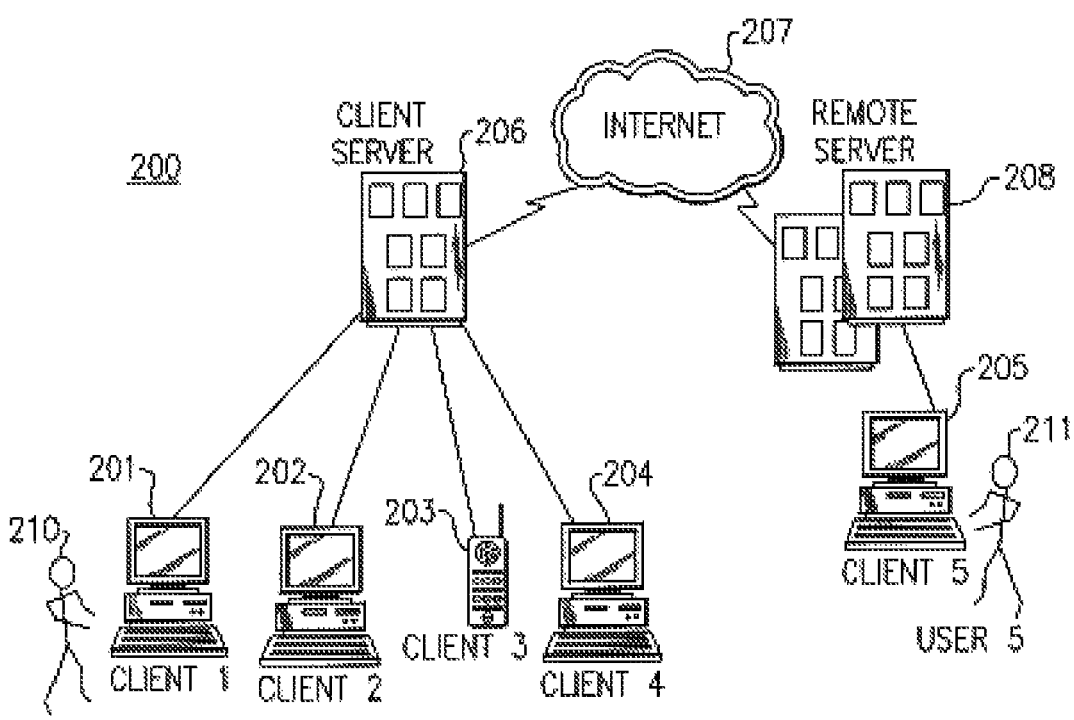
FIG. 2 is a diagram depicting a network of computer systems.

FIG. 2 illustrates a data processing network 200 in which the present invention may be practiced. The data processing network 200 may include a plurality of individual networks, such as wireless network and a wired network, each of which may include a plurality of individual workstations 101. Additionally, as those skilled in the art will appreciate, one or more LANs may be included, where a LAN may comprise a plurality of intelligent workstations coupled to a host processor.

Still referring to FIG. 2, the networks may also include mainframe computers or servers, such as a gateway computer (client server 206) or application server (remote server 208 which may access a data repository). A gateway computer 206 serves as a point of entry into each network 207. A gateway is needed when connecting one networking protocol to another. The gateway 206 may be preferably coupled to another network (the Internet 207 for example) by means of a communications link. The gateway 206 may also be directly coupled to one or more workstations 101 using a communications link. The gateway computer may be implemented utilizing an International Business Machines (IBM) eServer zSeries 900 Server available from IBM.

Software programming code which embodies the present invention is typically accessed by the processor 106 of the system 101 from long-term storage media 107, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network to other computer systems for use by users of such other systems.

Alternatively, the programming code 111 may be embodied in the memory 105, and accessed by the processor 106 using the processor bus. Such programming code includes an operating system which controls the function and interaction of the various computer components and one or more application programs. Program code is normally paged from dense storage media 107 to high speed memory 105 where it is available for processing by the processor 106. The techniques and methods for embodying software programing code in memory, on physical media, and/or distributing software code via networks are well known and will not be further discussed herein.

In the preferred embodiment, the present invention is implemented as one or more computer software programs 111. The implementation of the software of the present invention may operate on a user's workstation, as one or more modules or applications 111 (also referred to as code subroutines, or "objects" in object-oriented programming) which are invoked upon request. Alternatively, the software may operate on a server in a network, or in any device capable of executing the program code implementing the present invention. The logic implementing this invention may be integrated within the code of an application program, or it may be implemented as one or more separate utility modules which are invoked by that application, without deviating from the inventive concepts disclosed herein. The application 111 may be executing in a Web environment, where a Web server provides services in response to requests from a client connected through the Internet. In another embodiment, the application may be executing in a corporate intranet or extranet, or in any other network environment. Configurations for the environment include a client/server network, Peer-to-Peer networks (wherein clients interact directly by performing both client and server function) as well as a multi-tier environment. These environments and configurations are well known in the art.

In a preferred embodiment, a formal relational grammar specification of the various conditions is created, and then, through the use of parsing techniques, the embodiment identifies the solution appropriate for a particular situation. This invention uses this technique to specify patterns in the computational environment and identify the desired solutions.

Figure 3:
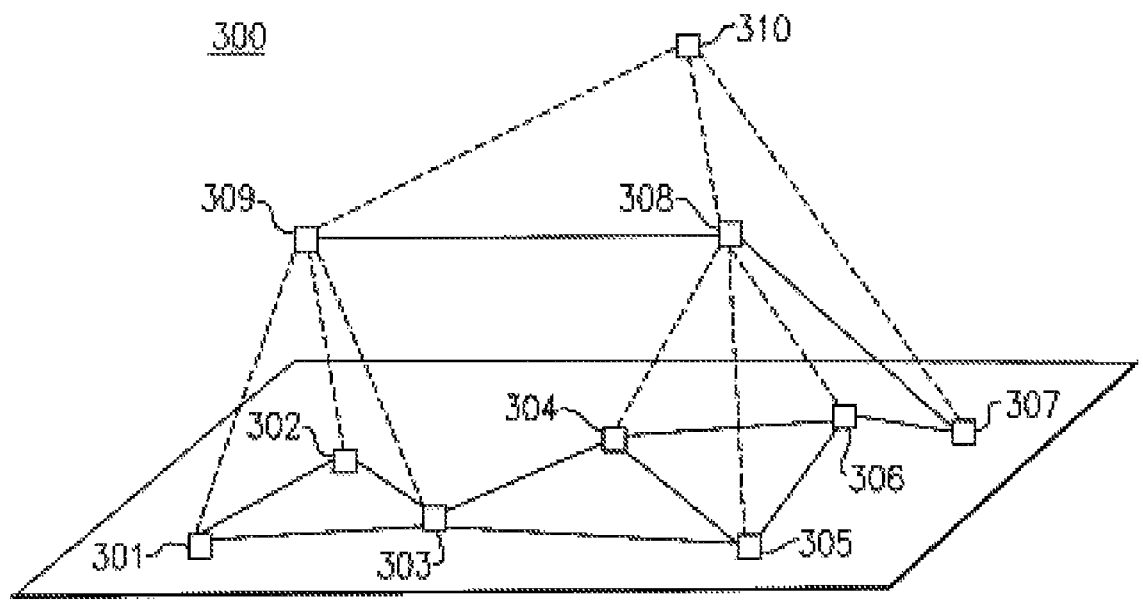
FIG. 3 is a diagram of a derivation tree structure.

Referring to FIG. 3, primitives and composites combine in forming new structure during the parsing process. The dots (nodes) 301-307 on the horizontal plane indicate lexical tokens in the input. Solid lines between the elements 301-302, 302-303, 303-304, 304-305, 305-306, 306-307, 307-308, 308-309, 304-306, 303-305, 301-303 represent relations between the elements while dashed lines 301-309, 302-309, 303-309, 309-310, 304-308, 305-308, 306-308, 308-310, 307-310 indicate new structure created through parsing. The top of the tree 310 represents the final "sentence" identified in the language which represents the goal state with associated actions to be taken in the autonomic system.

Figure 4:
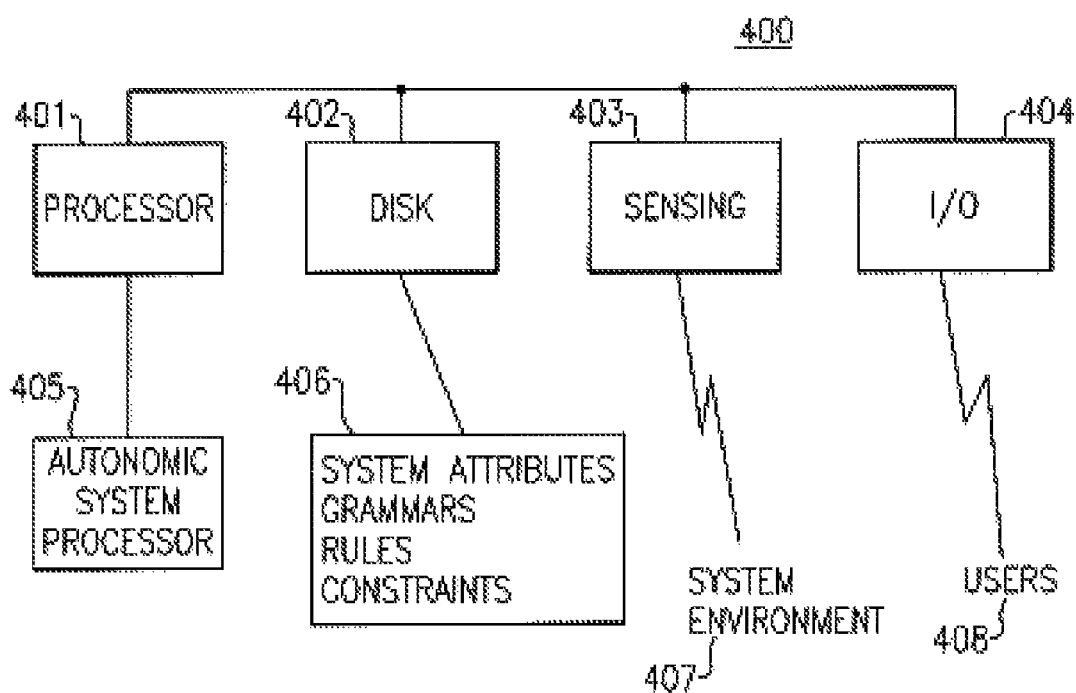
FIG. 4 is a depiction of an Autonomic computational linguistic response system.

FIG. 4 illustrates an example computational linguistic response system for autonomic computing. A processor 401 having non-volatile storage disk 402, system environment 407 sensing means 403 and user 408 interfacing means 404 has access to Autonomic System processor 405 which operate in conjunction with system attributes, grammars, rules and constraints 406 to perform autonomic processes.

Figure 5:
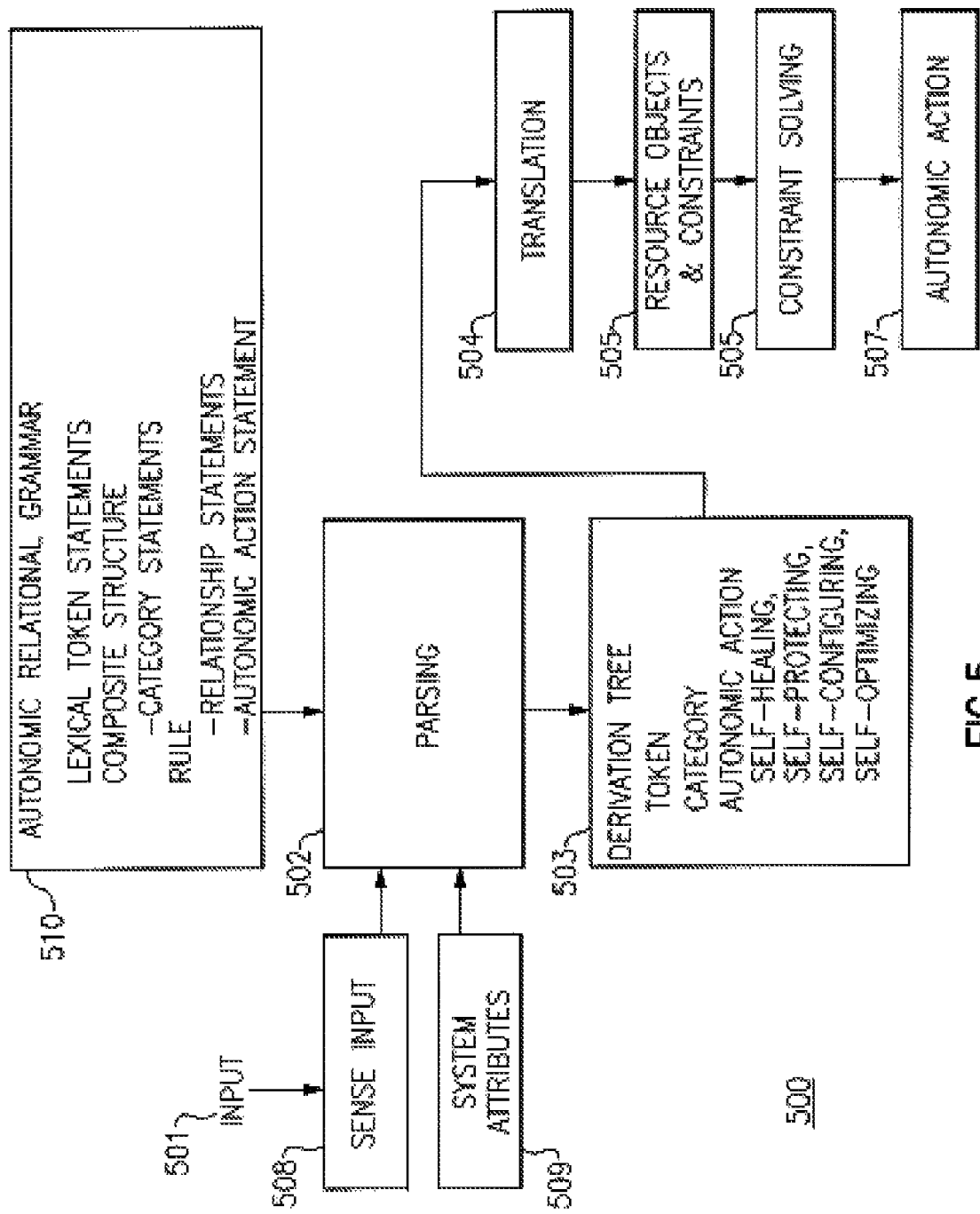
FIG. 5 is an illustration of an example process of the invention.

FIG. 5 illustrates the process of sensing changes in the environment, parsing of state information in the computational linguistic response system for autonomic computing and producing actions to make any necessary corrections.

Input 501:

The input 501 in the system consists of static system attributes 509 and dynamic conditions 501 sensed in the environment.

Input to the Parser

Input to the parser is the grammar and a set of conditions in the computing environment and domain-dependent relations which hold between them. Conceptually, the input is a database, which can be thought of abstractly as a graph with primitive objects as nodes and relations as (hyper) arcs. In the autonomic computing example, the system preprocesses the existing conditions and constructs its own internal database of the current state.

One example grammar is provided in Table 1. The example demonstrates the use of tags and ids for a preferred embodiment represented in XML.

The <element> tags in the rule definition represent the lexical tokens and compositional elements that form the basis for each rule. The elements are identified by an id attribute that is subsequently used in the rule to specify relations and resulting actions.

The <relation> tags in the rule definition represent the relationships between the elements of the rule. The ids are used to match the input elements with the appropriate relation conditions. The relation name has been identified in the system as a known relation that is supported.

The <action> tags in the rule definition represent an extension of Relational Grammars to include "semantic" attributes. Consistent with standard practice in compiler design, where attributes are used to generate compiler code, herein attributes are used to generate code for monitoring and fixing computational environments.

Referring to FIG. 7, a relational grammar 705 is composed of lexical tokens 701, composite categories 702, rules 704, and relationships 703 in the rules. In addition, the rule may contain autonomic actions 706 to be performed. The rules contain relationships including simple unary relationships (i.e., attributes) and relationships between the elements of the rule. In addition, the rule may contain actions to take if this rule is used in a final derivation tree. A computational linguistic grammar for an autonomic computing environment is created by creating a first lexical token statement 701, and a category statement 702 identifying the results of rule firings. A first relationship is defined 703 for the lexical token and/or categories. The first relationship may be an attribute or may comprise a relationship to another token or category. A first rule for deriving a composed element from the first token and first attribute is defined 704. Within the rule, optional action statements 706 may be included that perform actions when a derivation tree becomes final. The Relational grammar 705 (lexical tokens, categories and rules) is saved 707 in storage.

The Autonomic Relational Grammar 510 for the domain of autonomic computing comprises statements, using a markup language such as XML, portraying the lexical tokens, categories and roles describing the interrelationship by use of XML statements.

Parsing 502:

System processes (first and second sensor processes) sense input changes 508 and system attributes 509 as changes in the environment. In a preferred embodiment, an attribute change is sensed when the attribute is instantiated. A reader process reads an autonomic relational grammar, the relational grammar comprises lexical token statements, category statements and a rule. The rule comprises relationship statements and action statements. Using the language defined for the domain of autonomic computing environments, the system processes the elements and relationships building one or more derivation trees 503.

Derivation Tree 503:

The derivation tree 503 is the result of the parsing step. A derivation tree is only complete if a goal state is reached. A derivation tree comprises a token, a category, a relationship and an autonomic action.

Translation 504:

Each grammar rule has an associated set of attributes which are used to compute the output forms from a syntactic derivation tree. Here, the output determines a set of actions that will be taken in the computing environment. An identifier process identifies an autonomic action to be performed. The action is performed by a performer process.

Resource Objects & Constraints 505:

The derivation trees 503 are manipulated by a determiner process to determine the resource object and constraints that should be applied. Resource objects of the environment and their constraints are the output of the translation phase 504. A solver process solves the constraints to form a constraint solution for the resource object. A second identifier process identifies an autonomic action to be performed using the constraint solution.

Constraint Solving 506:

A constraint resolution procedure is invoked, if necessary, to solve the constraints among system objects that determine the actual numerical values to use for the modification of the environment. Potentially, constraints can be used to solve any conflicts in actions to be taken and objects on which to take the actions. For example, constraints can be solved which orders the sequence of actions to take.

Resource Autonomic Actions to Take 507:

Final autonomic actions and their parameters are determined from constraint solving and autonomic steps are taken to modify the computational environment. The goal state will have one or more autonomic actions associated with the derivation tree 503.

The detailed description explains the preferred embodiments of the invention, together with advantages and features, by way of example with reference to the drawings.

This invention uses a special approach to computational linguistics that is embodied in Relational Grammars. These grammars have relationships between the tokens of the language. An example of a language for an autonomic problem is presented herein. Other languages can be used to practice the present invention using the concepts taught herein.

This is an example of how the lexical tokens in the language might be defined and are provided herein as examples to teach the invention. These are the primitive types of the language. Compositional elements are built through the application of the rules during parsing 502.

FIGS. 6A-6E illustrate an example of the derivation trees of the rules in this simple grammar of Table 1. In a preferred embodiment, intermediate categories are created which may participate in other rules not shown. Lexical token statements (batchProcess 601, IdlePool 602, BackgroundPool 603, InteractivePool 604, Users 605 and Servers 606 programmably represent resources identified for the system. Composed elements LargeQueue 607, slowResponse 609, slowResponse 610 and SlowResponse 613 are derived from rule statements according to related lexical tokens. The final categories 608 611 612 614 programmably represent the actions to be taken in response to rules and rule stimulus Autonomic computational linguist grammars are created as follows:
- a token creator process, creates a first lexical token statement, the statement identifying a token representing a state or process in an autonomic environment;
- a category creator process, creates a first category statement, the statement identifying a first category representing a derived state or process in an autonomic environment;
- a rule creator process, creates a plurality of autonomic rule statements defining an autonomic rule for deriving a category, the statements comprising a relationship statement and an action statement; and
- a saver process, saves the first lexical token statement and the autonomic rule statements as a relational grammar.

The processes used in creating the linguistic grammar preferably comprise a text editor providing guidance, checking, tracking and simulation capabilities known in the art for programming text editors.

Self-Configuring System Example:

A self-configuring example is presented to demonstrate the concepts of the present invention. In an example situation using the grammar of Table 1, an autonomic environment consists of pools of computers. Depending on response time of servers and the number of users participating, computers are reallocated between the 3 pools.

Figure 6A:
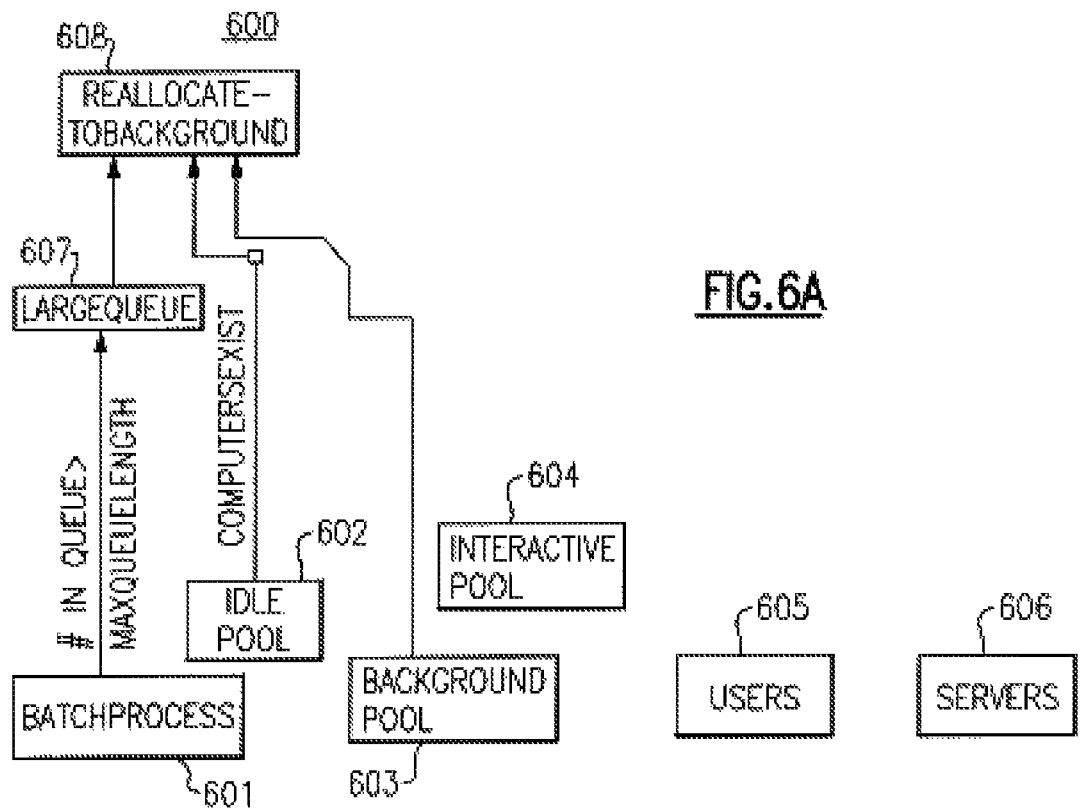
FIGS. 6A-6E illustrate the structure of the rules in an example embodiment.
Figure 6B:
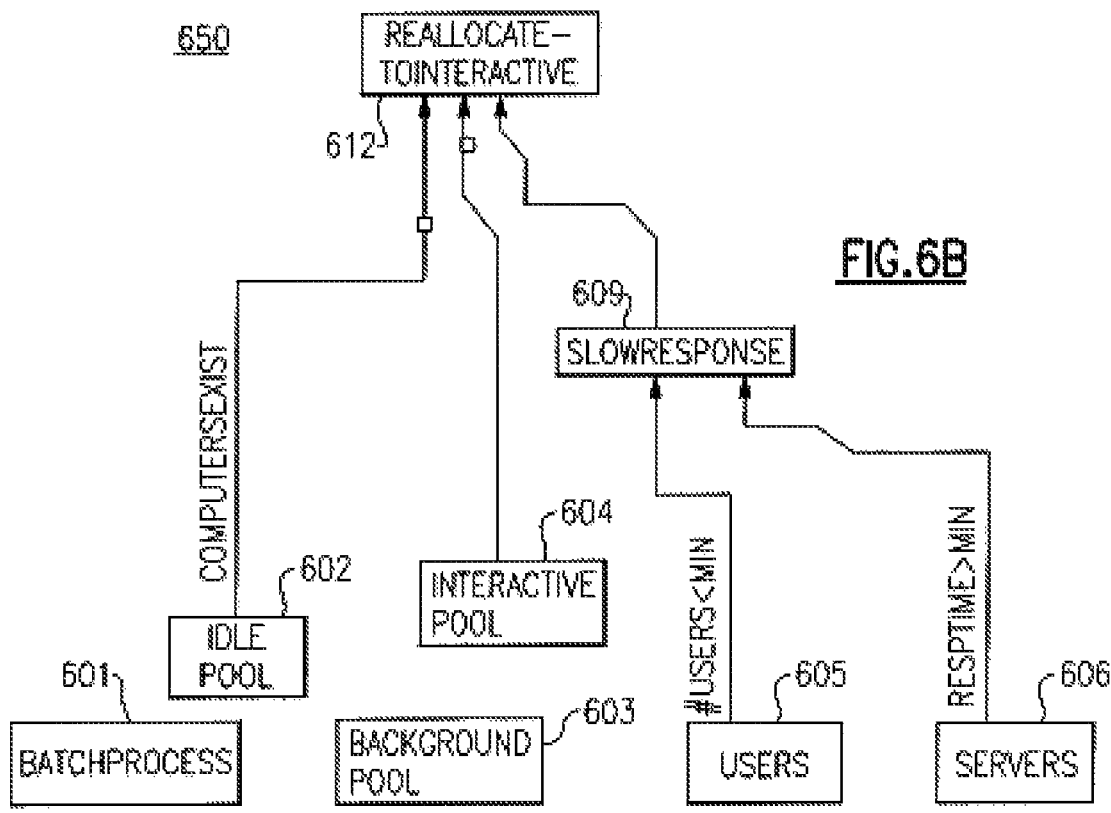
Figure 6C:
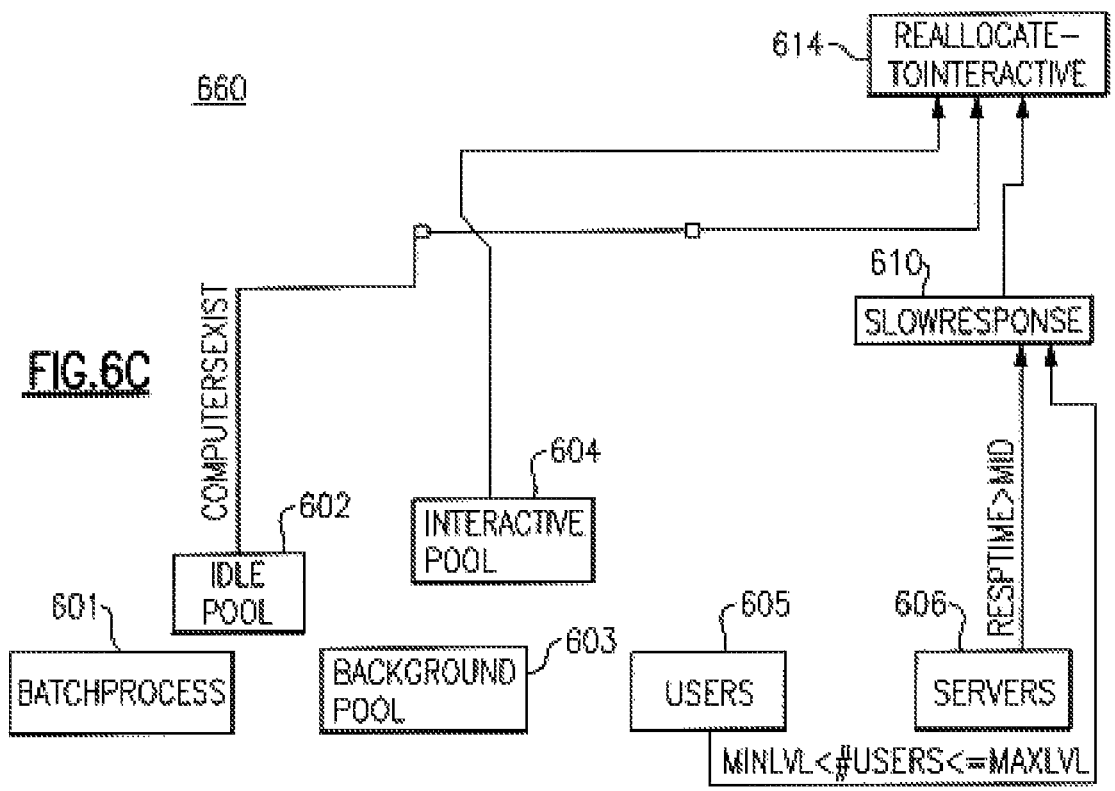
Figure 6D:
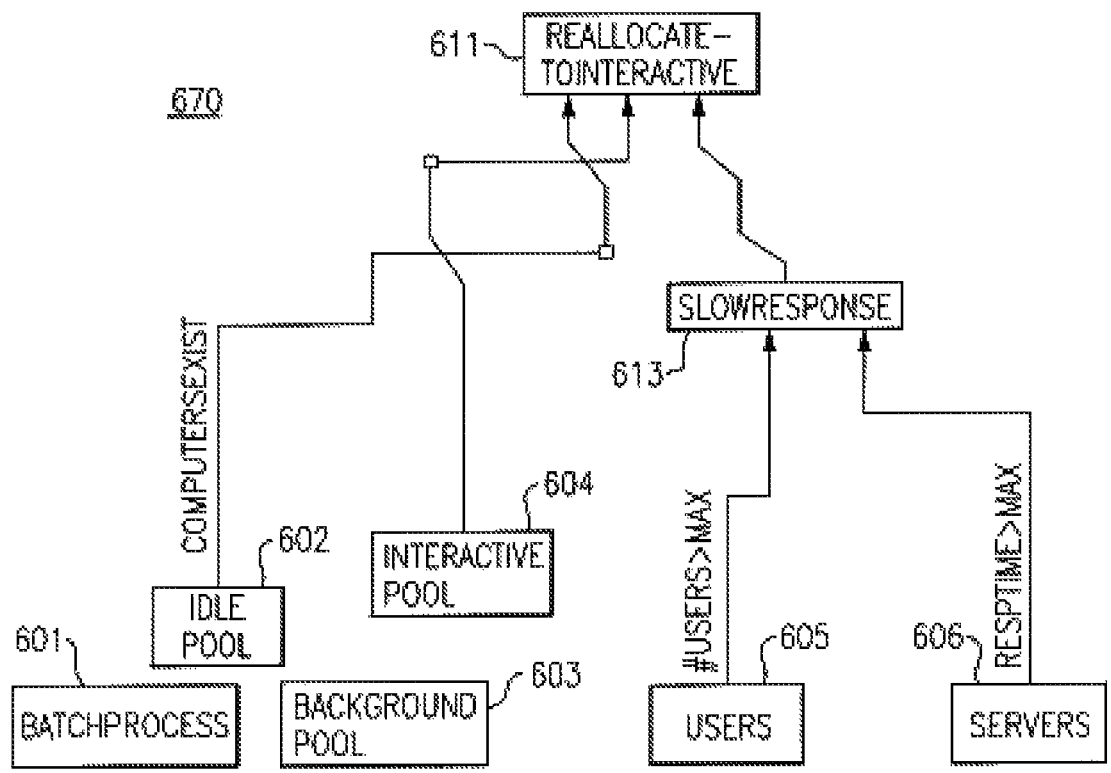
Figure 6E:
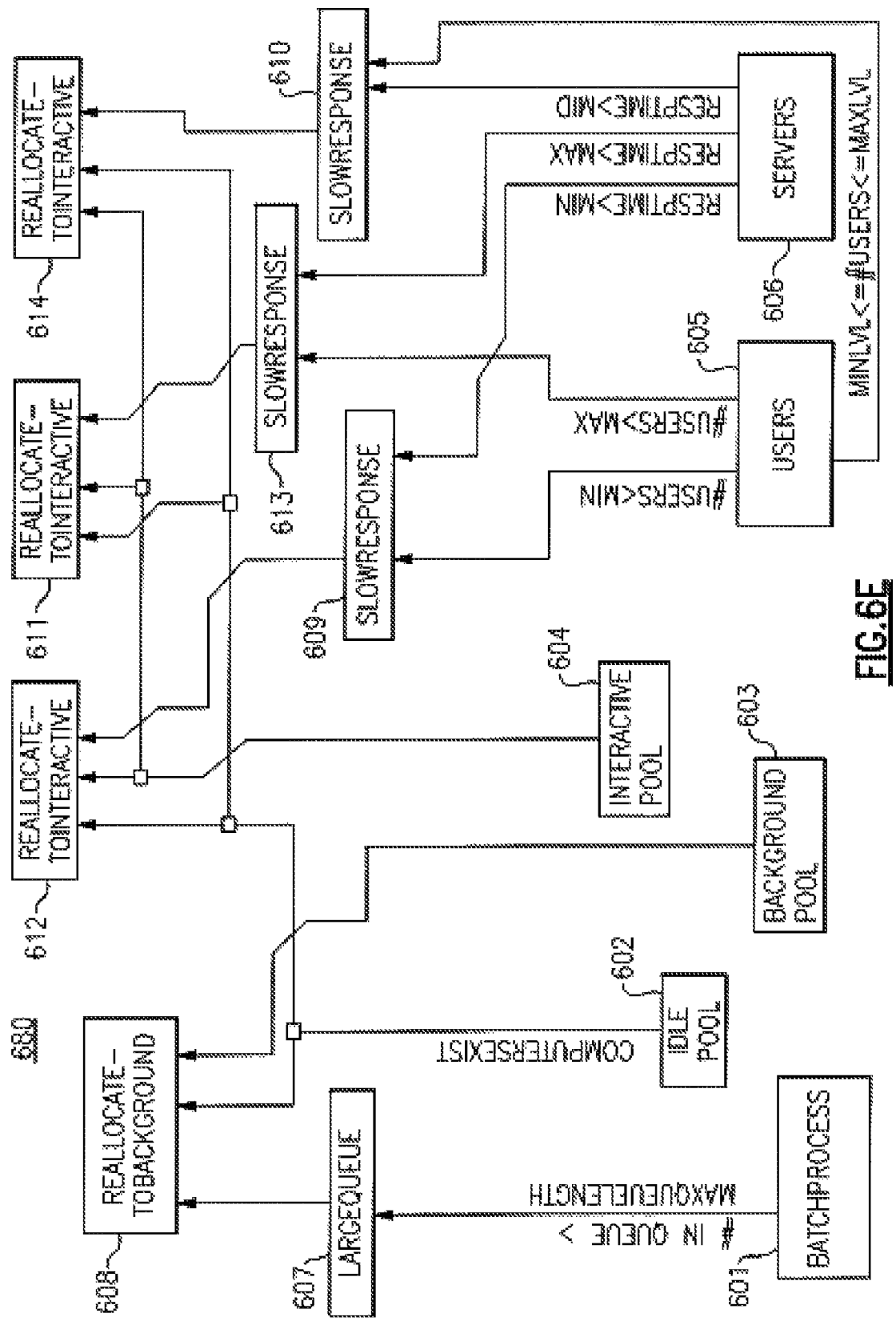

Referring to Table 1 as well as FIG. 5 and FIG. 6E, which show the self-configuring example which comprises a set of rules in an autonomic relational grammar ("SelfConfiguringSystem") to support a self configuring system. In this example FIG. 6E, there are 3 pools of computers including an idle pool (idlePool token 602), a background pool (backgroundPool token 603) and an interactive pool (interactivePool token 604). The idlePool 602 is a set of computers idle and available for use in either the backgroundPool 603 or the interactivePool 604. The backgroundPool 603 is doing a number of jobs in the background (batchProcess token 601) with an associated queue. When the queue becomes too long (e.g., over 5 jobs), a new computer is reallocated 608 to the backgroundPool 603 from the idlePool 602. The interactivePool 604 supports users in a client-server fashion. If the responseTime for the user 605 becomes too great, an additional computer is allocated (611, 612 or 614) to this pool from the idlePool 602, if available. The response time limit is based on the number of users 605. In this example, if the number of users is less than 10, the acceptable response time limit is 0.001 seconds. If the number of users grows to over 100, the acceptable response time limit is 0.003 seconds. In between 10 and 100 users, the acceptable response time limit is 0.002 seconds. When the queues or response times decrease to such a point as to be not an issue, computer resources are released back into the idlePool 602.

In table 1, a simple relational grammar for a self configuring system is defined. Statements 1-6 represent the lexical tokens of the system. Statements 7-10 represent the categories of composed elements. The rules are defined in lines 11-93. The first example rule, lines 11-23 trigger the "SlowResponse" composed element 609 identified in line 12. The head of the rule is labeled with id="0". Lines 13-14 identify a value for the tokens 605, 606. Lines 15-18 provide a first relational attribute, number of current users is less than a minimum level for users (#users<Min), Users token 605. Within the rule, this token is identified by the element (id="1"). This id is used in subsequent rule statements to refer to this token. Line 16 refers to this token 605 and accesses its attribute of "numberOf" to determine the number of users. Likewise, line 17 identifies the minimumLevel attribute from the token users 605.

In this example, 10 is the minimum number of users. Lines 19-22 provide a second relation statement (response time greater than a minimum response time value) (RespTime>Min) for a server token 606 (identified by attribute id="2"). Line 20 provides the value of the current system response time from external sensors. Line 21 provides a value of 0.001 for a minimum response time for our example. When both of these relational statements being sensed by changes in the "users" 605 or "servers" 606 are true, the composed element "slowResponse" 609 will be created.

Similarly, a second rule (lines 24-40) will create a "slowResponse" 610 category if the number of users (line 29) greater than or equal to the minimum level line 30 (10 users in our example) and the number of users line 33) is less than or equal to the maximum level line 34 (100 users in our example) (MinLvl<=#Users<=Maxlvl) and a Server 606 response time (line 37) is greater than a mid response value (RespTime>Mid) line 38 (0.002 second in our example).

Lines 41-53 describe a third rule for reallocating idle computers 602 to the interactive pool 604 creating a category of slowResonse 613. This rule triggers when the number of users (line 46) exceeds the maximum level (line 47) (#Users>Max) and the response time (line 50) is greater than the maximum response time (RespTime>Mid).

Lines 54-69 describe a fourth rule which uses the output from rules 1-3 slowResponse category 609 610 613 line 56. Also, a token for interactivePool 604 line 58 and idlePool 602 line 57 are inputs to this rule. The rule creates the category reallocateToInteractive (line 55) 611, 612 or 614 and includes action statements (lines 60-68) to perform the action of allocating an idle pool computer to the interactive pool.

Lines 70-77 describes a fifth rule for identifying that the current number of jobs in the queue in the batchProcess token 601 line 72 exceeds a predetermined maximum number line 75 (5 jobs in our example).

Lines 78-93 describes a sixth rule creating a ReallocateTo-Background category 608 which includes the action statements lines 84-92 of re-allocating a computer from the idle pool 602, if they exist, to the background pool 603.

The grammar 510 is defined and saved 707. External modules of the system 508, 509 continually look for updates in the input 501. In an example, this includes the number of users 605 (e.g., 8 users), the system response time 606 (e.g., 0.0005 sec), the number of processes in the batch queue 601, and the number of computers in each pool 602-604. When updates occur in the attributes of these lexical tokens, the parser 502 runs trying to build or extend derivation trees 503. For example, when the response time increases to be greater than the minimum level for less than 10 users (0.001 sec), the rule "SlowResponseTime1" fires (Table 1, lines 11-23). This creates the intermediate category "slowResponse" 609. The parser 502 continues to look for more categories to build. Since computers exist in the idle pool 602, and the interactive pool exists 604, the category "reallocateToInteractive" 612 is constructed using rule "ReallocateIdleToInteractive" (Table 1, lines 54-69). This all happens in the parsing step of 502. The result of this parsing is the derivation tree 650. A translation step 504 takes this derivation tree and collects all the resource objects, actions, and constraints from all the rules contributing to this derivation tree 650. In this example, the only action, "ReallocateIdle" is defined in Table 1, line 60-68. This example does not contain any constraints. In an embodiment including constraints, constraints are processed next 506. In one example (not shown), Constraints preferably include, the triggering of actions in a specific order, the merging of actions, and the overriding of actions when two actions conflict with one another. In one embodiment, the constraints order multiple steps in a sequence. A constraint statement looks like an action statement and preferably uses temporal constraints (before, after, etc) to sequence the actions. For example the statements:

```
<constraint name="before">
    <arg id="5">
    <arg id="6">
</constraint>
``` identify two resulting actions by their action ids, <arg id="5"> and <arg id="6">. The process of constraint solving 506, applies the constraints and in this case, orders the actions (action 5 before action 6). Finally, the set of ordered autonomic actions are executed 507. In our example, our one action executes resulting in the reallocation of an idle pool computer 602 to the interactive pool 604.

The set of Derivation Trees 680 of the example grammar of Table 1 is shown in FIG. 6E. FIG. 6A shows a Derivation Tree 600 for reallocating computers to a Background Pool 603 from an Idle Pool 602. FIGS. 6B, 6C and 6D show three Derivation Trees 650, 660 and 670 for Reallocating computers from an idle Pool 602 to an Interactive Pool 604 based on a slow response time. The response time limit from the server will vary based on the number of active users. In the example, if the number of users is below the minimum level, the response time should be less than 0.001 second (FIG. 6B). If the number of users is greater than or equal to the minimum level and less than or equal to the maximum level, the response time should be less than 0.002 seconds (FIG. 6C). Finally, if the number of users is greater than the maximum level, the response time should be less than 0.003 (FIG. 6D).

These rules only illustrate the allocation of computers to either the backgroundPool or the interactivePool. Similar rules would exist to de-allocate resources back into the idle-Pool.

We can look at table 1 in the context of FIG. 5 to further explain the steps of the system. The grammar is defined and saved as 510. The system continually looks for updates in the input. In this example, this includes the number of users, the system response time, the number of processes in the batch queue, and the number of computers in each pool. When changes occur in the inputs, the parser runs to try to build or extend derivation trees. Rules in this grammar will run and eventually build a derivation tree that represents a final category, i.e. ReallocateToInteractive. When a goal state is reached during parsing, this triggers the translation phase 504. In this step, the objects and autonomic actions identified by the rule action statements are collected 505. These actions may include constraints that hold between the actions. In the simple example of table 1, no constraints are defined. These constraints might include the triggering of actions in a specific order, the merging actions, or overriding actions when two actions conflict with one another. In the constraint solving phase, the final actions and the order to apply them are identified. Processing continues with the application of the actions to the objects in the computing environment. The system continues to look for new input and parse that input against the existing derivation trees that are partially built.

TABLE 1

Self-Configuring example:

Lexical tokens:
1) <entry lexicon="SelfConfiguringSystem" category="users"/>
2) <entry lexicon="SelfConfiguringSystem" category="servers"/>
3) <entry lexicon="SelfConfiguringSystem" category="batchProcess"/>
4) <entry lexicon="SelfConfiguringSystem" category="idlePool"/>
5) <entry lexicon="SelfConfiguringSystem" catagory="backgroundPool"/>
6) <entry lexicon="SelfConfiguringSystem" catagory="interactivePool"/>
Categories:
7) <category name="SlowResponse" grammar="SelfConfiguringSystem"/>
8) <category name="FastResponse" grammar="SelfConfiguringSystem"/>
9) <category name="LargeQueue" grammar="SelfConfiguringSystem"/>
10) <category name="SmallQueue" grammar="SelfConfiguringSystem"/>

TABLE 1-continued

Self-Configuring example:

```
Rules for composite building:
11)     <rule name="SlowResponseTime1"
grammar="SelfConfiguringSystem"/>
12)         <element id="0" category="SlowResponse"/>
13)         <element id="1" category="users"/>
14)         <element id="2" category="servers"/>
15)         <relation name="lessThan">
16)             <relation name="numberOf"      arg="1"/>
17)             <relation name="minimumLevel"  arg="1"/>
18)         </relation>
19)         <relation name="greaterThan">
20)             <relation name="responseTime"  arg="2"/>
21)             <relation name="minResponseTime" arg="2"/>
22)         </relation>
23)     </rule>
24)     <rule name="SlowResponseTime2"
grammar="SelfConfiguringSystem">
25)         <element id="0" category="SlowResponse"/>
26)         <element id="1" category="users"/>
27)         <element id="2" category="servers"/>
28)         <relation name="greaterThanOrEqual">
29)             <relation name="numberOf"   arg="1"/>
30)             <relation name="minLevel"   arg="1"/>
31)         </relation>
32)         <relation name="lessThanOrEqual">
33)             <relation name="numberOf"   arg="1"/>
34)             <relation name="maxLevel"   arg="1"/>
35)         </relation>
36)         <relation name="greaterThan">
37)             <relation name="responseTime"  arg="2"/>
38)             <relation name="midResponseTime" arg="2"/>
39)         </relation>
40)     </rule>
41)     <rule name="SlowResponseTime3"
grammar="SelfConfiguringSystem">
42)         <element id="0" category="SlowResponse"/>
43)         <element id="1" category="users"/>
44)         <element id="2" category="servers"/>
45)         <relation name="greaterThan">
46)             <relation name="numberOf"   arg="1"/>
47)             <relation name="maxLevel"   arg="1"/>
48)         </relation>
49)         <relation name="greaterThan">
50)             <relation name="responseTime"  arg="2"/>
51)             <relation name="maxResponseTime" arg="2"/>
52)         </relation>
53)     </rule>
54)     <rule name="ReallocateIdleToInteractive"
grammar="SelfConfiguringSystem">
55)         <element id="0" category="ReallocateToInteractive"/>
56)         <element id="1" category="SlowResponse"/>
57)         <element id="2" category="idlePool"/>
58)         <element id="3" category="interactivePool"/>
59)         <relation name="computerExist" arg="2"/>
60)         <action name="ReallocateIdle">
61)             <step id="4" name="getComputerFromPool">
62)                 <arg id="2"/>
63)             </step>
64)             <step id="5" name="allocateToPool">
65)                 <arg id="4"/>
66)                 <arg id="3"/>
67)             </step>
68)         </action>
69)     </rule>
70)     <rule name="LargeJobQueue"
grammar="SelfConfiguringSystem">
71)         <element id="0" category="LargeQueue"/>
72)         <element id="1" category="batchProcess"/>
73)         <relation name="greaterThan">
74)             <relation name="numberofJobsInQueue" arg="1"/>
75)             <relation name="maxQueueLength" arg="1"/>
76)         </relation>
77)     </rule>
78)     <rule name="ReallocateIdleToBackground"
grammar="SelfConfiguringSystem">
79)         <element id="0" category="ReallocateToBackground"/>
80)         <element id="1" category="LargeQueue"/>
81)         <element id="2" category="idlePool"/>
82)         <element id="3" category="backgroundPool"/>
83)         <relation name="computersExist" arg="2"/>
84)         <action id="6" name="ReallocateBackground">
85)             <step id="4" name="getComputerFromPool">
86)                 <arg id="2"/>
87)             </step>
88)             <step id="5" name="allocateToPool">
89)                 <arg id="4"/>
90)                 <arg id="3"/>
91)             </step>
92)         </action>
93)     </rule>
```

Self-Protecting System Example

Table 2 is an example set of rules in a grammar to support a self protecting autonomic system. In this example, there are servers behind a network dispatcher which is behind a firewall. When a number of requests from a single IP exceeds a threshold for a given time period (30 seconds), rules fire in the language to automatically protect the system by blocking access at the firewall from that IP address.

Again, the lexical tokens are described in lines 1-3 and the categories are defined in lines 4-5 for the grammar "SelfProtectingSystem" and tokens are defined. Lines 6-18 describe a first rule for testing the number of requests from an IP address and creating a "PossibleDenialAttack" category. Lines 19-34 describe a second rule for creating a "DenialAttack" category and triggering an action to block requests from that IP address.

TABLE 2

Self-Protecting System:

```
Lexical tokens
1)      <entry lexicon="SelfProtectingSystem"
        category="networkDispatcher"/>
2)      <entry lexicon="SelfProtectingSystem" category="firewall"/>
3)      <entry lexicon="SelfProtectingSystem"
        category="ipAddress"/>
Categories
4)      <category grammar="SelfProtectingSystem"
        name="PossibleDenialAttack"/>
5)      <category grammar="SelfProtectingSystem"
        name="DenialAttack"/>
Rules
6)      <rule name="PossibleDenialOfServiceAttack"
        grammar="SelfProtectingSystem"
7)      <element id="0" category="PossibleDenialAttack"/>
8)      <element id="1" category="networkDispatcher"/>
9)      <element id="2" category="ipAddress"/>
10)         <relation name="greaterThan">
11)             <relation name="numberOfRequests"   arg="2"/>
12)             <relation name="maxNumberOfRequests" arg="1"/>
13)         </relation>
14)         <relation name="lessThan">
15)             <relation name="accessInterval"     arg="2"/>
16)             <relation name="minAccessInterval"  arg="1"/>
17)         </relation>
18)     </rule>
19)     <rule name="DenialOfServiceAttack"
grammar="SelfProtectingSystem">
20)         <head id="0" category="DenialAttack"/>
21)         <element id="1" category="PossibleDenialAttack"/>
22)         <element id="2" category="firewall"/>
23)         <relation name="externalIP">
24)         <relation name="ipAddressOf" arg="1"/>
25)         </relation>
26)         <action id="6" name="blockIP">
27)             <step id="3" name="ipAddressOf">
```

TABLE 2-continued

Self-Protecting System:

| | |
|---|---|
| 28) | <arg id="1"/> |
| 29) | </step> |
| 30) | <step id="5" name="blockIP"> |
| 31) | <arg id="2"/> |
| 32) | <arg id="3"/> |
| 33) | </step> |
| 34) | </action> |

While the preferred embodiment of the invention has been illustrated and described herein, it is to be understood that the invention is not limited to autonomic computing or the precise construction herein disclosed, and the right is "reserved" to all changes and modifications coming within the scope of the invention as defined in the appended claims.

What is claimed is:

1. A system for autonomic computing using a relational grammar, the system comprising:
    a network;
    a computer system in communication with the network, wherein the computer system includes instructions to execute a method, comprising:
    reading an autonomic relational grammar from memory, the autonomic relational grammar comprising a plurality of program statements, the program statements comprising one or more lexical token statements, one or more category statements one or more relationship statements and one or more autonomic action statements, wherein a rule comprises the one or more relationship statements and the one or more autonomic action statements;
    sensing a change in an input value related to a first token identified by a first lexical token statement of the one or more lexical token statements;
    parsing the input value with the relational grammar to form an autonomic derivation tree, the autonomic derivation tree comprising the first token, a first category, a first relationship and an autonomic action;
    using the derived autonomic derivation tree to identify the autonomic action to be performed; and
    performing the identified autonomic action, the autonomic action comprising any one of:
    configuring the computer system;
    optimizing functionality of the computer system;
    recovering the computer system from a malfunction; or
    protecting an environment of the computer system.

2. The system according to claim 1, further comprising any one of:
    changing the input value related to the first token if an attribute is instantiated at initialization time; or
    changing the input value related to the first token if there is a change in a value of the first token.

3. The system according to claim 1, wherein the rule further comprises a second category statement and wherein the derivation tree further comprises a second category.

4. The system according to claim 1, wherein the rule further comprises a second lexical token statement and wherein the derivation tree further comprises a second token.

5. The system according to claim 1, wherein the relationship statements further comprise any one of a system attribute or the relationship between any one of the first category or the first token and any one of a third category or a third token.

6. The system according to claim 1, wherein the relational grammar further comprises a plurality of rule statements for defining a second rule.

7. The system according to claim 1, wherein the method further comprises:
    determining resource objects and constraints;
    solving the constraints to form a constraint solution for the resource objects; and
    using the constraint solution to identify the autonomic action to be performed.

8. A computer readable medium storing computer readable program code for autonomic computing using a relational grammar, for performing a method comprising:
    reading an autonomic relational grammar from memory, the autonomic relational grammar comprising a plurality of program statements, the program statements comprising one or more lexical token statements, one or more category statements one or more relationship statements and one or more autonomic action statements, wherein a rule comprises the one or more relationship statements and the one or more autonomic action statements;
    sensing a change in an input value related to a first token identified by a first lexical token statement of the one or more lexical token statements;
    parsing the input value with the relational grammar to form an autonomic derivation tree, the autonomic derivation tree comprising the first token, a first category, a first relationship and an autonomic action;
    using the derived autonomic derivation tree to identify the autonomic action to be performed; and
    performing the identified autonomic action, the autonomic action comprising any one of:
    configuring the computer system;
    optimizing functionality of the computer system;
    recovering the computer system from a malfunction; or
    protecting an environment of the computer system.

9. The computer readable medium according to claim 8, further comprising any one of:
    changing the input value related to the first token if an attribute is instantiated at initialization time; or
    changing the input value related to the first token if there is a change in a value of the first token.

10. The computer readable medium according to claim 8, wherein the rule further comprises a second category statement and wherein the derivation tree further comprises a second category.

11. The computer readable medium according to claim 8, wherein the rule further comprises a second lexical token statement and wherein the derivation tree further comprises a second token.

12. The computer readable medium according to claim 8, wherein the relationship statements further comprises any one of a system attribute or the relationship between any one of the first category or the first token and any one of a third category or third token.

13. The computer readable medium according to claim 8, wherein the relational grammar further comprises a plurality of rule statements for defining a second rule.

14. The computer readable medium according to claim 8, wherein the method further comprises:
    determining resource objects and constraints;
    solving the constraints to form a constraint solution for the resource objects; and
    using the constraint solution to identify the autonomic action to be performed.

* * * * *